United States Patent Office

3,500,931
Patented Mar. 17, 1970

3,500,931
METHOD FOR HEATING AN OIL RESERVOIR BY INJECTING ALTERNATE SLUGS OF STEAM AND HIGHER SPECIFIC HEAT MATERIAL
Richard L. Sloan, Houston, Tex., assignor to Tenneco Oil Company, Houston, Tex., a corporation of Delaware
No Drawing. Filed Aug. 20, 1968, Ser. No. 753,905
Int. Cl. E21b 43/24
U.S. Cl. 166—303     1 Claim

ABSTRACT OF THE DISCLOSURE

A method of heating an oil reservoir penetrated by an injection well in order to recover hydrocarbons therefrom. It contemplates alternate injections of slugs of steam and slugs of another material, which other material has a higher specific heat than water, such as ammonium hydroxide, ammonia, butane, hydrogen, methane, or propane.

---

This invention relates to a method of heating an oil reservoir penetrated by injection well in recovering hydrocarbons therefrom. More particularly it relates to an injection method of heating an oil reservoir employing alternate slugs of steam and another material which other material has a higher specific heat than water.

During thermal recovery operations in oil production, transmission and retention of heat in an oil reservoir has been an important problem for a number of years. For example, heavy crude deposits which cannot be produced by conventional techniques have been successfully stimulated by various thermal techniques. Water as steam is one of the most economic substances known so far as heat transfer is concerned. However, other substances are available that do have a higher specific heat.

In the past, it has been common practice to inject 80% quality steam as a means for carrying heat into the reservoir. This method does not release the maximum amount of heat in-situ, even if the steam is super heated. Other substances have a higher specific heat than water, so the heat released thereby would be greater for a given addition of heat during the change of phases from a vapor to a liquid.

It is therefore an object of this invention to provide an improved method of transmission and retention of heat in an oil reservoir. This is accomplished by injecting a fluid of higher specific heat followed by a thermal process such as steam injection. Stated another way, the purpose of the invention is to inject a high specific heat substance into the reservoir, and move the substance with usual thermal techniques to obtain maximum in-situ heat transfer where it is needed.

Briefly stated, the method is for heating an oil reservoir penetrated by an injection well and recovering hydrocarbons therefrom. It includes the steps of alternately injecting a slug of steam into the reservoir through the well and a slug of another material which other material has a higher specific heat than water, to thereby heat the formation. The alternate injection steps are repeated until the reservoir is heated to a predetermined temperature, at which the oil is produced from the formation.

The purpose of the slug of higher specific heat material is to take advantage of in-situ heat transfer from the slug to the reservoir environment, which would be rock and fluids contained therein. This is then followed by a less costly slug of lower specific heat material such as water as steam to thereby push the slug of higher specific heat material farther away from the well bore. The result of this alternate injection of steam and the other material is the accomplishment of greater heat transfer to the rock and fluids than by the usual steam-heat transfer process. A preferred step in this invention is the use of ammonia, or ammonium hydroxide as the primary slug and water as steam as the secondary slug. Alternate slugs are injected until the reservoir is adequately heated to a predetermined extent. The advantage of this invention is that more heat is released in-situ than could ordinarily be released in-situ by steam injection alone.

It is to be understood that this invention can be practiced as a displacement process or as a cyclic "huff and puff" process. In either instance, more heat will be released in the formation by this method than by conventional steam methods.

It is to be further understood that ammonium hydroxide would be a suitable fluid for the slug injection, however if outstanding results were obtained from ammonium hydroxide, straight ammonia gas could be injected in one of the later stages, depending upon the economics of the relative costs involved.

In one preferred form of the invention utilizing ammonium hydroxide, the process would include the step of first injecting approximately one-fourth of the usual steam injection cycle. This would then be followed with the injection of preheated ammonium hydroxide which should be preheated to the range of about 150° F. to 250° F. The volume of the ammonium hydroxide would be equivalent to 5% to 10% by volume of the previous steam slug.

The foregoing steps are then repeated until three slugs of ammonium hydroxide have been injected and with the last one-fourth of the steam cycle volume used as a flush.

When using gaseous ammonia, the same procedure as ammonium hydroxide would be used except the preheating phase.

It is to be understood that the method may be carried out by the alternate steps discussed above, but it is generally preferred to steam slug first. By injecting steam, the higher specific heat material slug passes through this preheated interval in the reservoir and retains or may actually realize an increase in total heat content.

The following is a list of substances having a higher specific heat than water.

| Liquids: | Sp. heat Btu./lb./°F. |
|---|---|
| Ammonium hydroxide | 1.14 |
| Gases: | |
| Ammonia | 0.52 |
| Butane | 0.456 |
| Hydrogen | 3.409 |
| Methane | 0.593 |
| Propane | 0.473 |

It is to be understood that the pressures and temperatures contemplated by this injection process will vary with the depth of the reservoir to be treated, rock properties, oil properties, and a temperature required to reduce viscosity to the desired level, all of which problems are known to those skilled in the art.

Further modifications may be made in the invention without departing from the scope thereof as defined in the following claim.

What is claimed is:
1. The method of heating an oil reservoir penetrated by an injection well in order to recover hydrocarbon therefrom, said method comprising the steps of:

alternately injecting a slug of steam and a slug of heated hydrogen gas into said reservoir through said well, to thereby heat said formation;

and, repeating said steps of alternately injecting steam and said hydrogen gas into said reservoir until said reservoir is heated to a predetermined extent.

References Cited

UNITED STATES PATENTS

| | | | |
|---|---|---|---|
| 2,288,857 | 7/1942 | Subkow | 166—303 X |
| 2,882,973 | 4/1959 | Doscher et al. | 166—305 X |
| 2,969,226 | 1/1961 | Huntington | 166—272 X |
| 3,101,781 | 8/1963 | Connally | 166—273 |
| 3,221,813 | 12/1965 | Closmann et al. | 166—272 X |
| 3,333,637 | 8/1967 | Prats | 166—303 X |
| 3,354,958 | 11/1967 | Parker | 166—303 |
| 3,358,762 | 12/1967 | Closmann | 166—303 |
| 3,425,492 | 2/1969 | Gilchrist | 166—272 |

OTHER REFERENCES

Hodgman, Charles D., et al., Handbook of Chemistry and Physics, Cleveland, Chem. Rubber Pub. Co., 36 ed., 1954, pp. 2082, 2083, 2107–2109.

STEPHEN J. NOVOSAD, Primary Examiner

IAN A. CALVERT, Assistant Examiner